(12) United States Patent
Unz

(10) Patent No.: US 8,271,512 B2
(45) Date of Patent: *Sep. 18, 2012

(54) PRESENTING DIGITIZED CONTENT ON A NETWORK USING A CROSS-LINKED LAYER OF ELECTRONIC DOCUMENTS DERIVED FROM A RELATIONAL DATABASE

(75) Inventor: Ron K. Unz, Palo Alto, CA (US)

(73) Assignee: Unz.org, LLC, Palo Alto, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 12/720,974

(22) Filed: Mar. 10, 2010

(65) Prior Publication Data
US 2010/0211905 A1 Aug. 19, 2010

Related U.S. Application Data

(63) Continuation of application No. 11/698,440, filed on Jan. 26, 2007, now Pat. No. 7,702,684.

(60) Provisional application No. 60/762,574, filed on Jan. 27, 2006.

(51) Int. Cl.
G06F 17/30 (2006.01)
G06F 7/00 (2006.01)

(52) U.S. Cl. .................. 707/758; 707/608; 707/769

(58) Field of Classification Search .......... 707/999.2, 707/999.5, 758, 769, 608
See application file for complete search history.

(56) References Cited

U.S. PATENT DOCUMENTS
6,751,343 B1 6/2004 Ferrell et al.
(Continued)

FOREIGN PATENT DOCUMENTS
JP 2004-128710 4/2004
(Continued)

OTHER PUBLICATIONS

Fraternali, Piero, "Tools and Approaches for Developing Data-Intensive Web Applications: A Survey", ACM Computing Surveys, vol. 31, No. 3, Sep. 1999, pp. 227-263.*

(Continued)

Primary Examiner — Hosain T. Alam
Assistant Examiner — Andalib Lodhi
(74) Attorney, Agent, or Firm — Hickman Palermo Truong Becker Bingham Wong LLP

(57) ABSTRACT

In an embodiment, a computer system comprises one or more content file servers having recorded thereon a plurality of digital content material items, and a plurality of digital graphical image files comprising graphical images associated with the content material items; wherein each of content material items comprises one or more data files of digitized electronic printed, audio, or video content material; one or more navigation page servers each comprising: one or more storage devices having recorded thereon a plurality of navigation page templates; a database comprising stored descriptive information about the content material items, including hierarchical and other relationships both between different content material items and between different subcomponents of content material items; logic encoded on the one or more storage devices and when executed operable to perform: receiving a request to view a particular navigation page, comprising a dynamically-generated electronic document; selecting one of the navigation page templates based on the request; creating and sending to the database, one or more queries for the descriptive information relating to the particular navigation page; receiving one or more results to the queries; generating, based on the one or more results, a particular navigation page comprising descriptive information about one or more of the content material items, portions thereof, or abstract collections thereof; a plurality of links to other such navigation pages; and zero or more links to particular content material items or portions thereof; sending only the particular navigation page to a client computer.

44 Claims, 13 Drawing Sheets

U.S. PATENT DOCUMENTS

| | | | |
|---|---|---|---|
| 6,772,139 | B1 | 8/2004 | Smith, III |
| 6,826,553 | B1 | 11/2004 | DaCosta et al. |
| 6,848,077 | B1 | 1/2005 | McBrearty et al. |
| 6,915,299 | B1 | 7/2005 | Arcuri et al. |
| 7,047,241 | B1 | 5/2006 | Erickson |
| 2002/0029225 | A1 | 3/2002 | Matsuzaki et al. |
| 2002/0091725 | A1* | 7/2002 | Skok .................... 707/501.1 |
| 2002/0095456 | A1 | 7/2002 | Wensheng |
| 2002/0103781 | A1 | 8/2002 | Mori et al. |
| 2002/0104071 | A1* | 8/2002 | Charisius et al. ........... 717/109 |
| 2002/0188635 | A1 | 12/2002 | Larson |
| 2004/0225658 | A1 | 11/2004 | Horber |
| 2005/0021512 | A1 | 1/2005 | Koenig |
| 2005/0165766 | A1 | 7/2005 | Szabo |
| 2006/0008789 | A1 | 1/2006 | Gerteis |
| 2006/0011716 | A1 | 1/2006 | Perkowski |
| 2006/0053410 | A1* | 3/2006 | Charisius et al. ........... 717/109 |
| 2007/0271247 | A1 | 11/2007 | Best et al. |
| 2008/0033770 | A1 | 2/2008 | Barth et al. |
| 2008/0140626 | A1 | 6/2008 | Wilson |
| 2009/0006201 | A1 | 1/2009 | Faseler, Jr. |

FOREIGN PATENT DOCUMENTS

| | | |
|---|---|---|
| JP | 2004128710 | 4/2004 |

OTHER PUBLICATIONS

Plessers, Peter, et al., "Accessibility: A Web Engineering Approach", WWW 2005, Chiba, Japan, May 10-14, 2005, pp. 353-362.*

China Patent Office, "Second Office Action", application No. CN 2007800003670.7, dated Jul. 7, 2010, 5 pages.

The State Intellectual Property Office of P.R.C., Chinese Office Action in application No. CN 200780003670.7, dated Feb. 11, 2011 (4 pages).

Ozharahan, E., "Multimedia Document Retrieval", Information Processing & Management, vol. 31, No. 1 © 1995, pp. 113-131.

Chang, S. et al., "Multimedia search and Retrieval," Advances in Multimedia: Systems, Standards and Networks, A Puri and T. Chen (eds.), New York: Marcel Dekker, © 1999, pp. 1-28.

Ekin, A. et al., "Integrated semantic-Syntactic Video Modeling for Search and Browsing," IEEE Transactions on Multimedia, vol. 6, No. 6, Dec. 2004, pp. 839-851.

Fraïssé, S. et al., "Generating Hypermedia from Specifications by Sketching Multimedia Templates," ACM Multimedia 96, Boston, MA, © 1996, pp. 353-363.

Zhuang, Y. et al., "Apply Semantic Template to Support Contest-Based Image Retrieval", IS&T/SPIE Conf. on Storage and Retrieval for Media Databases 2000, San Jose, CA, SPIE vol. 3972, Jan. 2000, pp. 442-449.

International Searching Authority, "International Search Report," PCT/US07/02153, dated Feb. 15, 2008, 8 pages.

Claims, PCT/US07/02153, 8 pages, May 20, 2008.

The International Bureau of WIPO, "International Preliminary Report on Patentability," PCT/US07/02153, dated Aug. 7, 2008, 2 pages.

State Intellectual Property Office of P.R.C., "Notification of the First Office Action (PCT Application Entering National Phase)", U.S. Appl. No. 2007800003670.7, Dec. 11, 2009, 7 pages.

Claims 60142-0027, U.S. Appl. No. 2007800003670.7, 6 pages, Feb. 25, 2010.

Current Claims for Application No. 200780003670.7, Applicant Unz.org, LLC, dated Feb. 2011, 4 pages.

Current Claims for Application No. 2007800003670.7, Applicant Unz.org, LLC, dated Jul. 2010, 6 pages.

Office Action in Application No. 2008-552432, dated Jan. 13, 2012, Applicant's Representative: Masashi Yanagida, et al., 3 pages.

Current Claims in application No. 2008-552432, dated Jan. 2012, 9 pages.

European Patent Office, "Search Report", in application No. 07762836.0-1225, dated Mar. 19, 2012, 9 pages.

Current Claims in application No. 07762836.0-1225, dated Mar. 2012, 6 pages.

Moura et al., "A Metadata Approach for Designing Configurable Interfaces in Digital Libraries", IEEE, Dated 2001, 6 pages.

Office Action in application No. 2,636,429, dated Apr. 19, 2012, 4 pages.

Current Claims in application No. 2,636,429 dated Apr. 2012, 9 pages.

Moura, Anna Maria, "A Metadata Approach for Designing Configurable Interfaces in Digital Libraries", dated 2001, 6 pages.

* cited by examiner

HOME | People | Content | Organizations | [ID=1]

All Decades Entire Periodical All Periodicals All Publications — 1002   *1000*

Dissent, Issues of the 1980s   /—1004

10 Years, 39 Issues, 1,083 Articles, 5,405pp: Winter 1980 to   Previous Decade Next Decade
Fall 1989   *1006*

Displaying: [Search] [Contents] [Issues] [Columns] [Covers] }—1008

[Subscribe]   *1018*   /—1010

| Issues of 1980 | • Winter, 23 Articles, 132pp PDF<br>Iran by Sharif Arani<br>*From the Shah's Dictatorship to Khomeini's Demagogic Theocracy*<br>• Spring, 20 Articles, 132pp PDF<br>American Politics in the 1980s by Walter Dean Burnham<br>/—1014   /—1016<br>• Summer, 24 Articles, 116pp PDF  }—1012<br>The Friedman Inventions by Gus Tyler<br><br>• Fall, 27 Articles, 140pp PDF<br>The Last Words of Jean-Paul Sartre by Benny Levy |
|---|---|
| Issues of 1981 | • Winter, 27 Articles, 132pp PDF<br>Poland: The Revolt of the Workers by Abraham Brumberg<br><br>• Spring, 25 Articles, 132pp PDF<br>Into Reaganland<br><br>• Summer, 30 Articles, 132pp PDF<br>Debate in Poland by Abraham Brumberg<br>*Should we call a general strike*<br>• Fall, 23 Articles, 132pp PDF<br>How Critical Is Our Condition? by Dennis H. Wrong<br>*A Look at the Left and Liberals in American* |
| Issues of 1982 | • Winter, 24 Articles, 132pp PDF<br>Enemy Colleagues: A Reading of the Salvadoran Tragedy by Gabriel Zaid<br>• Spring, 34 Articles, 132pp PDF |

*FIG. 10*

All Authors     HOME | People | Content | Organizations | [ID=1]
Author: Thomas W. Hazlett    ~— *1202*     *1200*
1 Reviewed Book, 3 Chapters, 164 Articles, 17 Reviews
Displaying: [Search] [All Content] [Reviewed Books] [Chapters] [Articles] [Reviews] } *1204*
[Major References]
Format: [Normal] [Condensed] [Covers] [Large Covers] } *1206*     *1210*
Sort by: [Type] [Title] [Date] [Size] / [Ascending] [Descending] } *1208*
[ALL] [2000s] [1990s] [1980s] [1970s] [1960s] [1950s] [1940s] [1930s] [1920s] [1910s] [1900s]
[Pre-1900] [Undated]
[ALL] [A] [B] [C] [D] [E] [F] [G] [H] [I] [J] [K] [L] [M] [N] [O] [P] [Q] [R] [S] [T] [U] [V]
[W] [X] [Y] [Z]     *1212*
[ALL] [FIRST] [PREVIOUS] [1-25] [26-50] [51-75] [76-100] [101-125] ... [NEXT] [LAST] } *1213*
Total = 185

1. ☐ Public Policy Toward Cable Television by Thomas W. Hazlett, Matthew L. Spitzer,

*The Economics of Rate Controls*     *1214*
   (1997) 1 Review

2. ☐ "The Road from Serfdom: F.A. Hayek (July 1992)" by Thomas W. Hazlett, pp.123-133 PDF
   In Free Minds and Free Markets (1993) by The Pacific Research Institute for Public Policy, 3. ☐ "Charles Murray (May 1985)" by Thomas W. Hazlett, pp.134-141 PDF
   In Free Minds and Free Markets (1993) by The Pacific Research Institute for Public Policy, 4. ☐ "The Viewer is the Loser (July 1982)" by Thomas W. Hazlett, pp.153-167 PDF
   In Free Minds and Free Markets (1993) by The Pacific Research Institute for Public Policy, 5. ☐ In Defense of Apathy by Thomas W. Hazlett, pp.495-497 PDF
   "Mind your own business" is a proper political slogan for free men in a free la...
       *1218*
   The Freeman/Ideas on Liberty, August 1976

6. ☐ Mencken vs. America by Thomas Winslow Hazlett, pp.22-27 PDF
       *1217*    *1216*     } *1215*
   Reason, September 1976
       *1220*

7. ☐ Carl Manager: Ivory Tower Iconoclast by Thomas W. Hazlett, pp.305-313 PDF
   *A look at the accomplishments of the founder of the Austrian School of economic...*
   The Freeman/Ideas on Liberty, May 1977

8.    Big Business Comes Out of its Corner... by Thomas Winslow Hazlett, pp.34-36 PDF

*FIG. 12*

HOME | People | Content | Organizations | [ID=1]
All Organizations
Organization: The Ludwig von Mises Institute  ~1302    1300
6 Periodicals, 1 Set, 12 Readable Books
Displaying: [Search] [All Content] [Periodicals] [Sets] [Readable Books] [Major] }1304
References]
Format: [Normal] [Condensed] [Covers] [Large Covers] }1306        1310
Sort by: [Type] [Title] [Date] [Size] / [Ascending] [Descending] }1308
[ALL] [2000s] [1990s] [1980s] [1970s] [1960s] [1950s] [1940s] [1930s] [1920s] [1910s] [1900s]
[Pre-1900] [Undated]
[ALL] [A] [B] [C] [D] [E] [F] [G] [H] [I] [J] [K] [L] [M] [N] [O] [P] [Q] [R] [S] [T] [U] [V]
[W] [X] [Y] [Z]                                                                          1312

Total = 12  /-1320  /-1316

1. ☐  Antitrust by The Ludwig von Mises Institiute, PDF ~1318
                                                              1314
       *The Case for Repeal*
       10 Chapters, 130pp (1987) 2 Reviews 2. ☐  The Free Market Reader by The Ludwig von Mises Institiute, PDF

*Essays in the Economics of Liberty*
       78 Chapters, 402pp (1988)

3. ☐  Man, Economy and Liberty by The Ludwig von Mises Institiute, PDF

*Essays in Honor of Murray N. Rothband*
       34 Chapters, 449pp (1989) 1 Review 4. ☐  The Gold Standard by The Ludwig von Mises Institiute, PDF

*Perspectives in the Austrian School*
       10 Chapters, 165pp (1992)

5. ☐  Requiem for Marx by The Ludwig von Mises Institiute, PDF

9 Chapters, 306pp (1993)

6. ☐  A New Land, a New People PDF
       *The American Colonies in the Seventeenth Century*

Conceived in Liberty 68 Chapters, 542pp (2000)

7. ☐  "Salutary Neglect" PDF
       *The American Colonies in the First Half of the Eighteenth Century*

Conceived in Liberty 46 Chapters, 304pp (2000)

8.    Advance to Revolution PDF
       Conceived in Liberty 75 Chapters, 384pp (2000)

*FIG. 13*

PRESENTING DIGITIZED CONTENT ON A NETWORK USING A CROSS-LINKED LAYER OF ELECTRONIC DOCUMENTS DERIVED FROM A RELATIONAL DATABASE

BENEFIT CLAIM

This application claims benefit as a Continuation of application Ser. No. 11/698,440, filed Jan. 26, 2007 now U.S. Pat. No. 7,702,684, the entire contents of which is hereby incorporated by reference as if fully set forth herein, under 35 U.S.C. §120, which claims the benefit under 35 U.S.C. §119(e) of Provisional Application 60/762,574, filed Jan. 27, 2006, the entire contents of which is hereby incorporated by reference as if fully set forth herein.

FIELD OF THE INVENTION

The present disclosure generally relates to data processing. The invention relates more specifically to methods of presenting and organizing digitized content material on a network such as the Internet.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In recent years, there have been growing efforts to digitize large quantities of printed content such as books and periodical issues and effectively distribute such content over the Internet.

This objective seems a reasonable one, since printed matter represents pure information and the internet is an efficient means of distributing such information.

Even long prior to the creation of the Internet, attempts to digitize and electronically distribute large quantities of printed content were widespread. For decades, the collective Gutenberg Project has been digitizing many thousands of classic books into text form and making them available for free downloads from major university computer sites. Database services such as Nexis-Lexis had digitized large portions of the archives of major newspapers and periodicals and made the articles available in searchable form to paying customers, originally through specialized computer terminals and more recently also through a subscription website.

More recently, in late 2003, Amazon.com released a free web-based system containing over 100,000 readable, searchable books in electronic form, and Google and Yahoo have subsequently also announced plans to provide large numbers of books in digitized form. Several magazines have made their archives available over the Internet in a variety of forms, sometimes for free and sometimes on a subscription basis.

Yet despite this seemingly natural fit between the digitization of printed content and its distribution over the Internet, the general adoption and use of these systems has usually proven much less successful than originally expected. For example, the original announcement of Amazon's 100,000 searchable digitized books in late 2003 generated enormous media coverage, but subsequent attention has been quite scanty, seemingly indicating that the actual effective use of the system is considerably lower than was originally envisioned. Various magazines have also privately indicated that the use of their digitized archives is considerably below their original hopes and expectations.

One weakness of these existing digitization systems for printed content may center upon the inherent trade-offs required in the two different forms such digitization schemes usually take, namely the "text-based" and the "image-based".

Under a text-based digitization system such as that of Nexis-Lexis or the Gutenberg Project, the printed content of a book, magazine article, or newspaper story is converted into a stored file of digital characters, for display as HTML on a web page or in some other form. Character storage formats such as ASCII are used.

This type of digitization has the advantage of providing the content in a light-weight format, and hence is very convenient for use over the Internet, even via a non-broadband connection. Also, the text displayed is exact, searchable, and can be copied-and-pasted from the browser window into any other form.

However, this text-based form of digitization also has serious disadvantages. First, producing the text requires performing a scan of the original printed content, followed by application of Optical Character Recognition (OCR) software to produce the text. Although automatic OCR has increasingly improved in quality, it still produces a noticeable rate of error, requiring subsequent manual-correction of the text, and therefore dramatically increasing the cost of the digitization process.

Also, the printed content of books and periodicals is frequently laid out on the page in a non-trivial and significant manner, and this layout is lost if the material is converted to pure text; furthermore, any colors, drawings, tables, or photographs are obviously lost as well.

In addition, such text-based content is seldom divided by the original pages, instead being usually provided either in the form of the large blocks of text representing complete articles or chapters or else being divided in a somewhat arbitrary manner, with neither of these choices being ideal.

Finally, the ruling of the U.S. Supreme Court in the 2001 *Tasini v. New York Times* decision appears to prohibit newspapers or magazines from permitting their freelance articles to be republished in a different (e.g. text-based) format without the prohibitively difficult requirement of securing authorization from each and every individual writer, unless the newspapers or magazines had previously obtained such authorization by contract. This was one of the factors recently cited by the New Yorker magazine in preventing its own archives from being digitized into a text-based format.

By contrast, the other, increasingly popular form of digitization is based on the presentation of the exact, scanned images of the printed content, generally as binary image files in JPEG, TIFF, web-optimized PDF, or some other type of binary image file format.

Although these binary image files require considerably more storage than pure text, most of the systems used allow the user to automatically retrieve only the page or two of material being examined rather than the complete contents of the entire book or periodical. Thus, instead of having to transmit the entire multi-megabyte PDF file of a book over the Internet, only a couple of pages are sent at time, allowing even large books to be conveniently readable over a non-broadband connection.

Being scanned binary images, the entire content of the original content material can be preserved, including colors, layouts, drawings, and photographs. If the format used is text-embedded PDF, the binary images are also text-searchable, and software options may be selected to allow the user to extract any portions of the actual text through standard copy-and-paste operations.

Finally, presentation of the exact scanned images of all the pages of a publication, especially if constituted as a single PDF file, seemingly falls within the permissible bounds of the Tasini decision, and therefore may be authorized at the sole discretion of the original publisher.

Despite these major advantages to the use of image files, considerable difficulties still remain. First, even despite recent technological advances, binary image files still remain considerably larger than regular HTML web pages, and many web users are reluctant to add links to these for fear of inconveniencing individuals who are limited to slow Internet connections. Second, the insertion of hyperlinks into the body of binary image files is either impossible or, in the case of PDF files, rather laborious, even though the latter format was actually developed partly to provide this exact capability. And once such hyperlinks are added to a PDF file, changing or modifying these in any way is almost as difficult. Probably for this reason, only a negligible fraction of the digitized printed content on the Internet based on binary images makes use of internal hyperlinks. And since the use of hyperlinks represents one of the most powerful and universal features of the Internet, largely sacrificing that capability is a huge weakness.

Furthermore, binary image files are static and fixed in their structure, and generally quite difficult to easily modify or manipulate. By contrast, the ubiquitous HTML web pages which dominate the Internet are flexible and easy to manipulate, and an unlimited number of such HTML pages can easily be generated from a single template file written in a web application language such as PHP or ColdFusion, with the dynamically-derived web pages being determined by the particular Universal Resource Locator (URL) selected and perhaps the changing values of a server database.

The enormous contrast between the easy linking and flexibility of HTML web pages and the difficulty of applying such techniques to large binary image files, including electronic documents in Adobe portable document format (PDF), probably helps account for the huge current dominance of the former throughout the Internet, and the relatively small amount of digitized printed content based on the latter.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10 illustrates an example navigation page as generated in an embodiment and comprising a periodical decade page.

FIG. 12 illustrates an example navigation page as generated in an embodiment and comprising an author page.

FIG. 13 illustrates an example navigation page as generated in an embodiment and comprising an organization page.

DETAILED DESCRIPTION 1.0 General Overview

Figure 1:
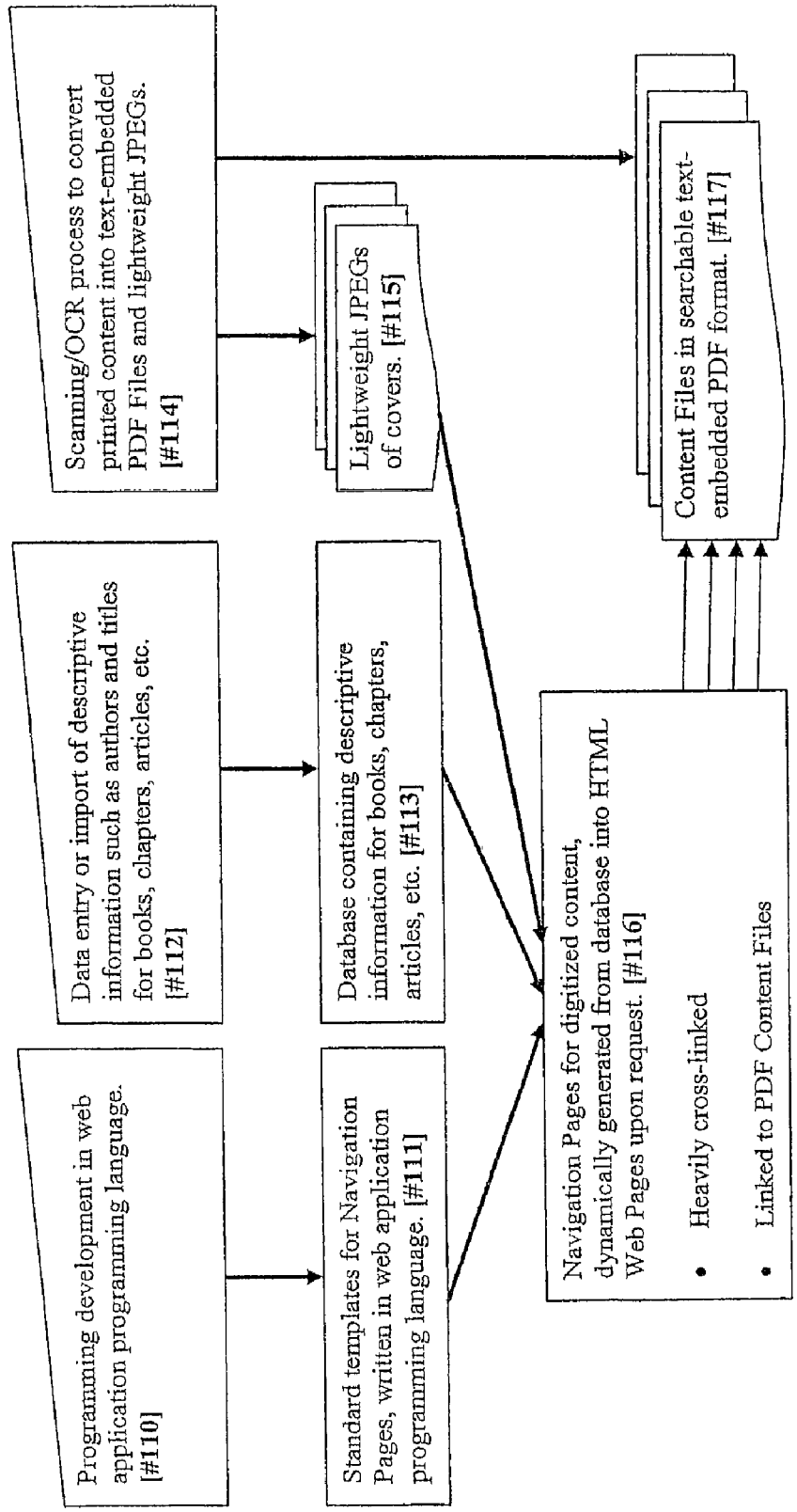
FIG. 1 shows a block diagram representing the normal production process for an example embodiment of the invention, in which several of the operations may be performed in parallel.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In one embodiment, a method and system for presenting digitized content on a network using a cross-linked layer of dynamic electronic documents derived from a database is provided.

In another embodiment, the invention provides a means of conveniently and inexpensively presenting content material items such as digitized books, periodical issues, and other printed content on the Internet by means of a massively-cross-linked intermediate layer of light-weight and flexible dynamic web pages derived from a relational database.

In one approach, a work of printed content is jointly associated with both the underlying binary image representation of the actual printed pages (the "Content Files") and also a set of one or more electronic documents, such as HTML web pages, which serve as an intermediate presentation, linking, and navigation layer to those Content Files (the "Navigation Pages"). When HTML web pages are used, the Navigation Pages may be lightweight and flexible, but other forms of electronic documents can be used as Navigation Pages. The Navigation Pages are dynamically generated by a limited amount of web application programming. The particular instantiations of the Navigation Pages are determined both by a request carried in a network location identifier, such as a Universal Resource Locator (URL), and by the values stored in a database. The Navigation Pages may comprise HTML text. Navigation Pages also may comprise embedded links to lightweight graphical images and also links to programmatic actions, such as Javascript action strings.

Certain embodiments of a digitization system for printed content can provide exactness, visual convenience, legality, light-weight, easy linking, flexibility, and dynamic database-driven production. The use of dynamic pages driven by a database allows the system to be modified or extended merely by updating the database and also automatically ensures the internal consistency and robustness of the system.

This digitization structure separates the Navigation Pages, which constitute the numerical bulk of the system, containing the design, layout, internal and external links, navigation structure, and organization, from the underlying Content Files that contain the actual binary images of the digitized printed material and dominate the physical size of the system.

Separating the Navigation Pages and Content Files in this approach allows the potentially quite large Content Files to remain unchanged even if the more numerous Navigation Pages representing the design structure of the system are transformed over time, either by changing portions of the web application programming or by updating the values contained in the relational database. Conversely, if future technological advances call for the modification or replacement of the underlying Content Files, such modification or replacement would have little or no necessary effect on the overall layout or design of the digitization system, which is separately represented by the collection of Navigation Pages.

This architecture also allows an embodiment in which the Content Files are made available on the Internet in an open, unrestricted, and transparently linkable form, while the Navigation Pages are simultaneously subject to various sorts of desired user restrictions, thereby providing the framework for a potentially workable "open content" system. Under various embodiments, some or all of the Content Files may be provided by third parties and hosted on third-party servers.

In one embodiment, Navigation Pages are dynamically generated by web application programming. This ensures that the Navigation Pages are automatically standardized, including the standardization of their inter-linkages and connections to the underlying Content Files. Also, since the Navigation Pages are only produced upon request of the user, even enormously large or almost unlimited numbers of such virtual Navigation Pages may involve no additional storage space prior to actual generation of the Navigation Pages.

In one embodiment, since the Navigation Pages are relatively numerous, lightweight, and generally determined by the requesting URL and the underlying relational database, instantiation of the Navigation Pages can be performed in parallel across a potentially large number of almost independent Navigation Page computer servers, each possessing separate copies of that unchanging relational database, and separated from the operation of the more limited number of Content File servers. This server multiplication may be useful for handling heavy user loads, since the bulk of traffic will probably be to the Navigation Pages. Also, since the Content Files for digitized material are generally far larger in size than the corresponding database information, the storage requirements of the Navigation Page servers will be lower compared to that of the overall system.

In one approach, the underlying Content Files may be represented by searchable files. For example, password-locked text-embedded PDF files may be used. Additionally or alternatively, the Content Files may be produced either via a scanning process from printed material or directly by the desktop-publishing software which originally produced the content. These Content Files may be mostly or entirely located on the system's servers (e.g. servers 320, 321 of FIG. 3).

The Navigation Pages for this embodiment may be dynamically generated electronic documents. For example, the Navigation Pages may be HTML web pages that are dynamically generated by one or more templates written in the ColdFusion web application programming language and connected to a MySQL relational database also maintained on the website server, with the Internet requests managed by an Apache web page server. In one embodiment, a generally small number of templates is needed. An example embodiment is described further below with reference to FIG. 2.

In an embodiment, the database contains a variety of descriptive information on the digitized publications. A relational database such as MySQL or Microsoft SQL-Server may be used. For example, the database stores the titles, subtitles, authors, and page numbers of the various books, periodical issues, articles, chapters, and other categories of printed content. The database also stores indexed values relating these different hierarchical database items to each other. Most of this descriptive information can be obtained either from various available third-party databases or from the actual books and periodical issues and their tables of contents obtained during or after the digitization process itself.

Thus, in one embodiment, each digitized book is represented by a Content File as well as a set of Navigation Pages. In an embodiment, one of the Navigation Pages can display the book's table of contents, with each chapter line item containing a link to the Navigation Page for that chapter as well as a link to the first page of that chapter in the Content Files. This approach allows the user to easily move from the Navigation Page for the entire book to the Navigation Page for any given chapter, or to the actual beginning of that chapter in readable binary image form. Meanwhile, in an embodiment, the Navigation Page for a given chapter may contain links to the Navigation Pages of the next and previous chapters as well as to the Navigation Page for the entire book and the beginning of that chapter in the Content File.

In this embodiment or another embodiment, a digitized periodical comprises a set of top-level Navigation Pages presenting the overall contents of the periodical. The Navigation Pages may comprise a summary of the different years or decades encompassed. A top-level Navigation Page may also be linked to a hierarchical series of Navigation Pages displaying the contents of the individual decades, years, quarters, or months of the periodical, each of which may be linked to its "parents," "children," and neighboring "siblings" in the Navigation Page hierarchy. In one embodiment, higher-level Navigation Pages are linked to the Navigation Pages for the individual issues of the periodical.

Each individual issue of a digitized periodical is represented by a Content File and a set of Navigation Pages. In one embodiment, at least one of the Navigation Pages displays the issue's table of contents. In an embodiment, the table of contents page contains one or more links to the Navigation Pages of each article as well as to the first page of that article in the Content file. In an embodiment, the Navigation Pages for the articles are linked to the Navigation Pages of the entire issue as well as to the beginning of that article in the Content File.

A digitization system as described herein may contain a potentially vast number of different Navigation Pages, representing the different periodicals, years, issues, articles, books, and chapters of the digitized publications, each being potentially presented in a variety of different display modes or formats, and all cross-linked in a number of different ways.

Aside from a small amount of descriptive text drawn from the database, Navigation Pages also may contain embedded links to one or more relatively small graphical images. In an embodiment, Navigation Pages display reduced JPEG versions of the covers of the books and periodical issues produced as byproducts of the digitization process. Such images may usefully serve as mnemonic devices allowing the user to more easily recall, distinguish, and locate the desired Navigation Page.

Since the Navigation Pages are dynamic database-driven pages, the Navigation Pages may be generated by a relatively few different templates written in the web application language, and taking their different forms and layouts based on the values drawn from the database. Thus, adding the potentially large number of additional Navigation Pages required for every additional digitized book or periodical requires a small amount of effort, apart from inserting the appropriate descriptive information into the underlying relational database. Navigation Pages can also be added as placeholders for content which the system does not contain in digitized form, for example films, music, or books without corresponding Content Files.

Furthermore, in various embodiments, the primary content Navigation Pages may be augmented by a large number of additional, somewhat more abstract Navigation Pages, useful for organizational purposes. For example, in one embodiment each author of a given publication in the system is represented by a set of additional Navigation Pages, cross-linking all the available works of that author in a variety of different representations. Similar sets of Navigation Pages would be available for individual organizations and the various books, periodicals, and reports they have produced. In another embodiment, a category of Navigation Pages may also display the entire range of periodical issues published at any given year and date, thereby providing a "time slice" of public information at that moment. Different embodiments may contain a wide range of other types of abstract Navigation Pages enabling the convenient and efficient grouping of publications across a wide variety of different axes and degrees of freedom.

In various embodiments, Navigation Pages corresponding to book review articles may contain links to Navigation Pages for the books reviewed, whether or not these books are represented by Content Files. Navigation Pages for books may be linked to Navigation Pages for the reviews of that book. Navigation Pages for films may be cross-linked with the Navigation Pages corresponding to the reviews of those films. In addition, these Navigation Pages might also contain a variety of other relevant or useful links, buttons, or type of information.

When a lightweight and dynamic form is used for the Navigation Pages, the Navigation Pages are highly suitable for linking. An embodiment containing a large number and variety of different Navigation Pages will allow users to more easily select a link suitable for their needs. An increase in such external links will raise the visibility of the linked pages and the overall system in the major Internet search engines.

Since the Navigation Pages are dynamically generated from a relational database, their linkages, internal structure, or organization can generally be specified by a small number of efficient database queries, thereby minimizing the computer overhead required for their generation. For example, these queries would be particularly efficient for producing grouped links of the digitized content of a related nature, such as a Navigation Page displaying all the periodical issues of a given year sorted by date or a Navigation Page displaying all the articles written by a given author sorted by title.

Further, in certain embodiments, the overall system architecture allows an efficient division of labor during the production process, separating the creation of (A) the appearance and linkages of the system, determined by the web application programming; (B) the binary image content, determined by the Content Files and generally produced by scanning/OCR; and (C) the characteristics of the particular Navigation Pages, determined by the relational database and partly derived via data-entry from the particular tables of contents. Therefore, the procedures used to produce or modify (A), (B), and (C) are largely independent and can be performed in sequence or possibly in parallel by different individuals or groups, thereby tending to maximize the efficiency of the production process. The efficiency of the production process may be further increased because in most cases nearly all the information required for the production of Navigation Pages is derived from a tiny fraction of the printed content, namely the tables of contents and perhaps the title pages.

In an embodiment, a computer system comprises one or more content file servers having recorded thereon a plurality of digital content material items, and a plurality of digital graphical image files comprising graphical images associated with the content material items; wherein each of content material items comprises one or more data files of digitized electronic printed, audio, or video content material; one or more navigation page servers each comprising: one or more storage devices having recorded thereon a plurality of navigation page templates; a database comprising stored descriptive information about the content material items, including hierarchical and other relationships both between different content material items and between different subcomponents of content material items; logic encoded on the one or more storage devices and when executed operable to perform: receiving a request to view a particular navigation page, comprising a dynamically-generated electronic document; selecting one of the navigation page templates based on the request; creating and sending to the database, one or more queries for the descriptive information relating to the particular navigation page; receiving one or more results to the queries; generating, based on the one or more results, a particular navigation page comprising descriptive information about one or more of the content material items, portions thereof, or abstract collections thereof; a plurality of links to other such navigation pages; and zero or more links to particular content material items or portions thereof; sending only the particular navigation page to a client computer.

2.0 Example Production Process and Operational Sequence

FIG. 1 shows a block diagram representing the normal production process for an example embodiment of the invention, in which several of the operations may be performed in parallel.

Programming development in the web application language [#110] produces one or more templates [#111] that are used to dynamically generate the Navigation Pages. Templates [#111] contain the basic design architecture of the system, including the specific layout and displayable views of the Navigation Pages, as well as their links to each other, to the Content Files, and to any external web pages. All such programming may be performed using Cold Fusion, PHP, or some other present or future web application language, using standard software programming techniques for the creation of dynamic web pages.

As shown in step 112, summary descriptive information on the digitized content material items is obtained either through data entry from the content itself or from an external database or other source and inserted into the underlying relational database [#113]. Standard database programming techniques may be used to insert such information. Step 112 may be performed in parallel with step 110. For various embodiments, such summary information might include the authors, titles, and starting pages of books, chapters, and articles. In the case of printed content material items, most of the summary information can usually be obtained from the table of contents page of the book or periodical issue.

Any printed content not already in binary image format may be scanned and digitized into such format using standard technologies, including OCR-processing to extract and embed ASCII versions of the text [#114]. Step 114 may be performed in parallel with steps 110, 112. For an example embodiment, the outputs of this processing are searchable text-embedded PDF files, which constitute the Content Files [#117] of this embodiment. In this example embodiment, the binary-images of the cover pages of the printed content are also separately extracted and compressed to produce lightweight JPEG graphical image files [#115] used for display on the Navigation Pages.

Once these production processes have been completed, the generation of a given Navigation Page [#116] draws upon the web application programming templates [#111], the descriptive information contained in the relational database [#113], and the lightweight graphical image files [#115], and may contain links to the appropriate Content Files [#117].

Figure 2:
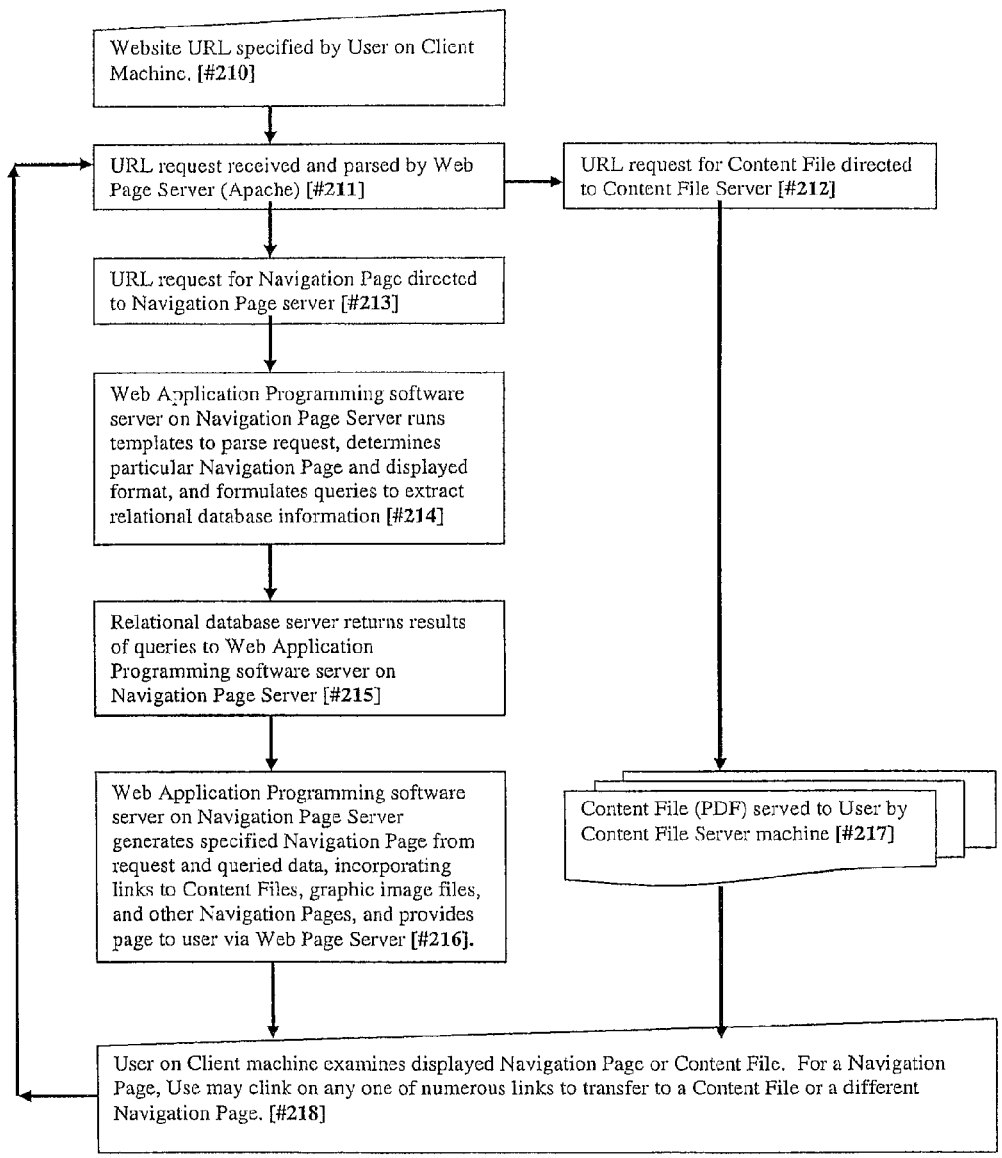
FIG. 2 provides a flow diagram summarizing the operational sequence of an example embodiment of the invention.

FIG. 2 provides a flow diagram summarizing the operational sequence of an example embodiment of the invention.

First, a user on a client machine specifies a particular network location identifier, such as a URL, for the website [#210]. This URL request is received and parsed by the web page server of the system [#211], which determines whether the URL request corresponds to a Content File or to a Navigation Page.

The particular method of indicating whether a URL request refers to a Content File or a Navigation Page is completely embodiment-dependent, and is chosen for programming convenience and elegance. For an example embodiment, the URL representing the default displayed view of the Navigation Page for an article beginning on page 30 of the Jun. 14, 1947 issue of Saturday Review would end in " . . . /Publication/SaturdayRev-1947jun14-00030". In this same example embodiment, the URL corresponding to the first page of that same article in the Content File of that issue would be indicated by adding the suffix "?View=PDF" to that string producing the URL ending " . . . /Publication/SaturdayRev-1947jun14-00030?View=PDF"

If the URL request is determined to correspond to a Content File, it is directed to the Content File Server [#212], which then delivers the appropriate Content File over the Internet to the user [#217].

If the URL request is determined to correspond to a Navigation Page, it is directed to the Navigation Page Server [#213]. Here, the Web Application Programming software server runs [#124] templates 111 to parse the request in more detail, determining the particular Navigation Page to be displayed and formulating one or more relational queries required to obtain the information required by that page. The one or more queries are sent to the relational database server, which returns the required data in a database server response [#215]. The software server then uses [#216] the data in the database server response to produce the Navigation Page, incorporating appropriate links to Content Files, graphic images, and other Navigation Pages, and via the web page server provides the resulting Navigation Page over the Internet to the user. The programming techniques used in the templates 211 for producing the appropriate Navigation Page are the standard ones for producing a complex dynamic web page from a URL request and the information contained in a relational database.

Once a requested Navigation Page has been received, the user can examine the information on that page or click on any of the numerous embedded links in order to transfer to a Content File or to a different Navigation Page [#218].

3.0 Example System Architecture

Figure 3:
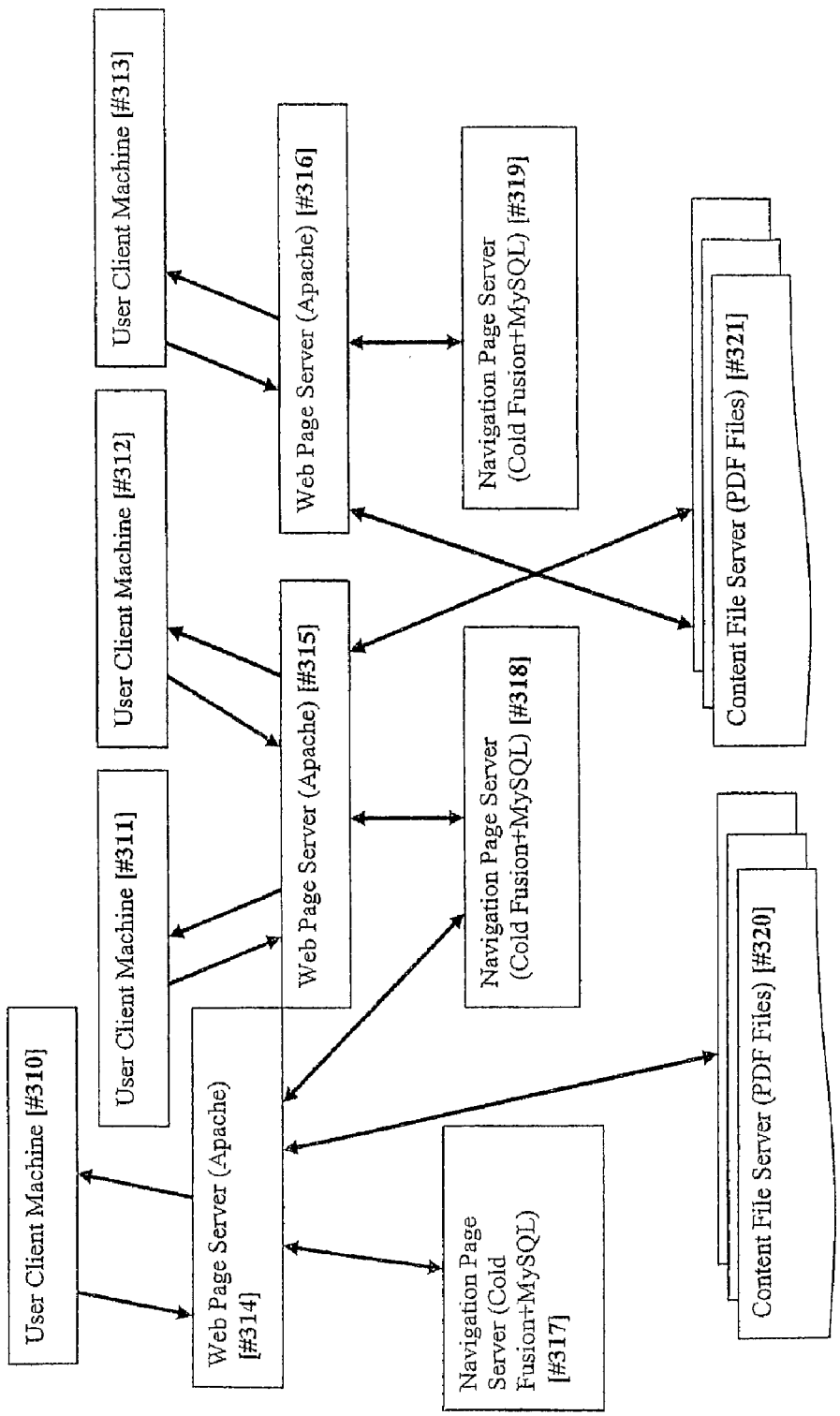
FIG. 3 shows a block diagram representing the overall Client/Server network architecture for an example embodiment of the invention.

FIG. 3 shows a block diagram representing the overall Client/Server network architecture for an example embodiment of the invention. Users on various Client Machines [#310-313] may provide Internet page requests to the system's one or more web page servers [#314-316], which then route these requests either to the one or more Navigation Page Servers [#317-319] containing the web application programming templates and software servers and the relational databases and database servers MySQL or the one or more Content File Servers [#320,321] which contain the binary PDF content files. The one or more Navigation Page servers contain the web application templates and software servers and the relational databases and database software servers. The one or more Content File servers contain the Content Files. For an example embodiment, web page server would be Apache, the web application programming would be Cold Fusion or PHP, the relational database would be MySQL, and the Content Files would be text-embedded PDF files.

4.0 Example Content and Page Relationships

Figure 4:
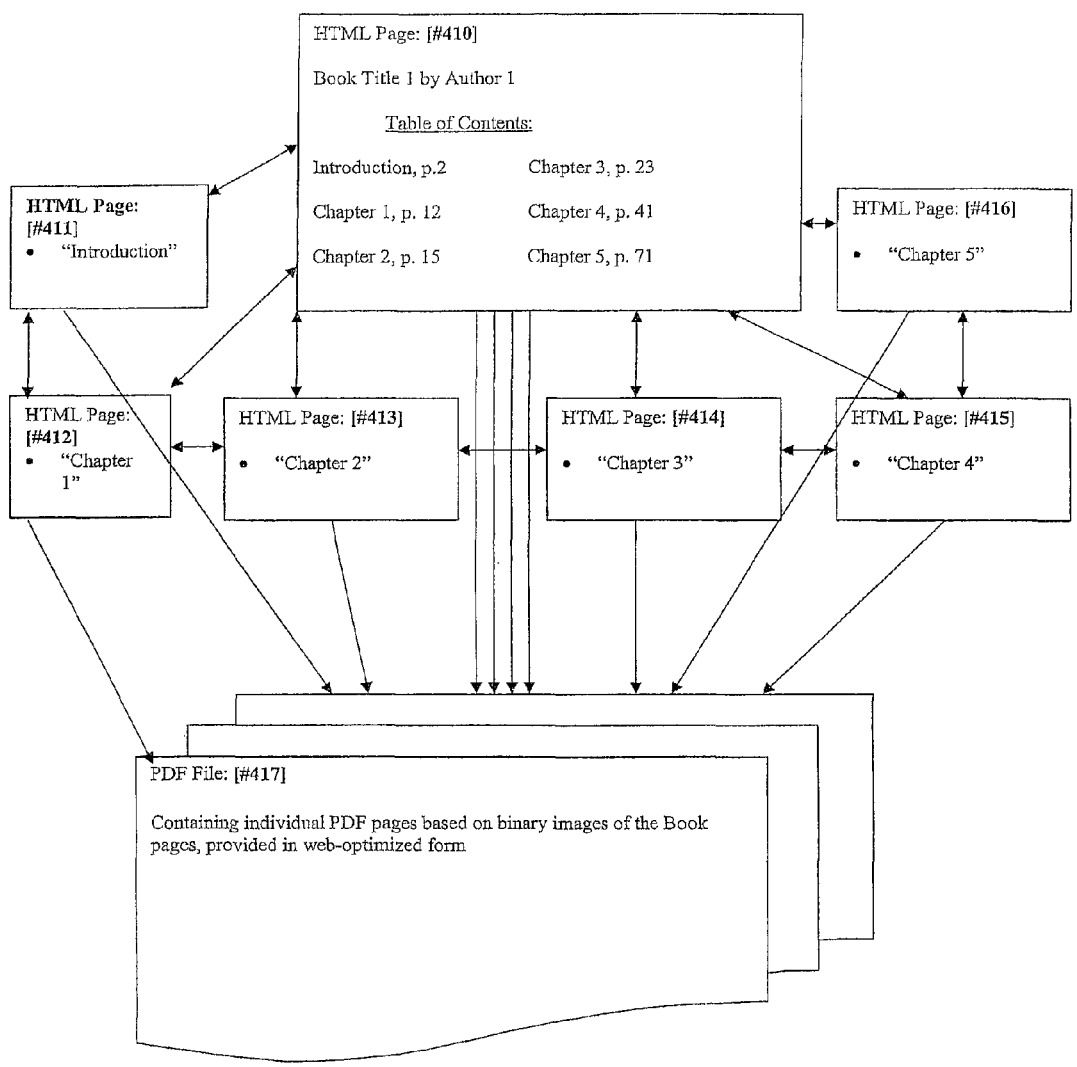
FIG. 4 shows a schematic diagram representing the interlinked Navigation Pages and Content File for a book under an example embodiment of the invention.

FIG. 4 shows a schematic diagram representing the interlinked Navigation Pages and Content File for a book under an example embodiment of the invention. A Navigation Page [#410] displays the book's table of contents, and is cross-linked with the Navigation Pages [#411-416] representing the different chapters of the book; each Navigation Page for a given chapter is also cross-linked with those for its neighboring chapters. In addition, these chapter Navigation Pages provide links to the appropriate points in the Content File [#417] for the entire book. For this embodiment, the Navigation Pages are provided as HTML Web Pages and the Content File is a PDF File.

Figure 5:
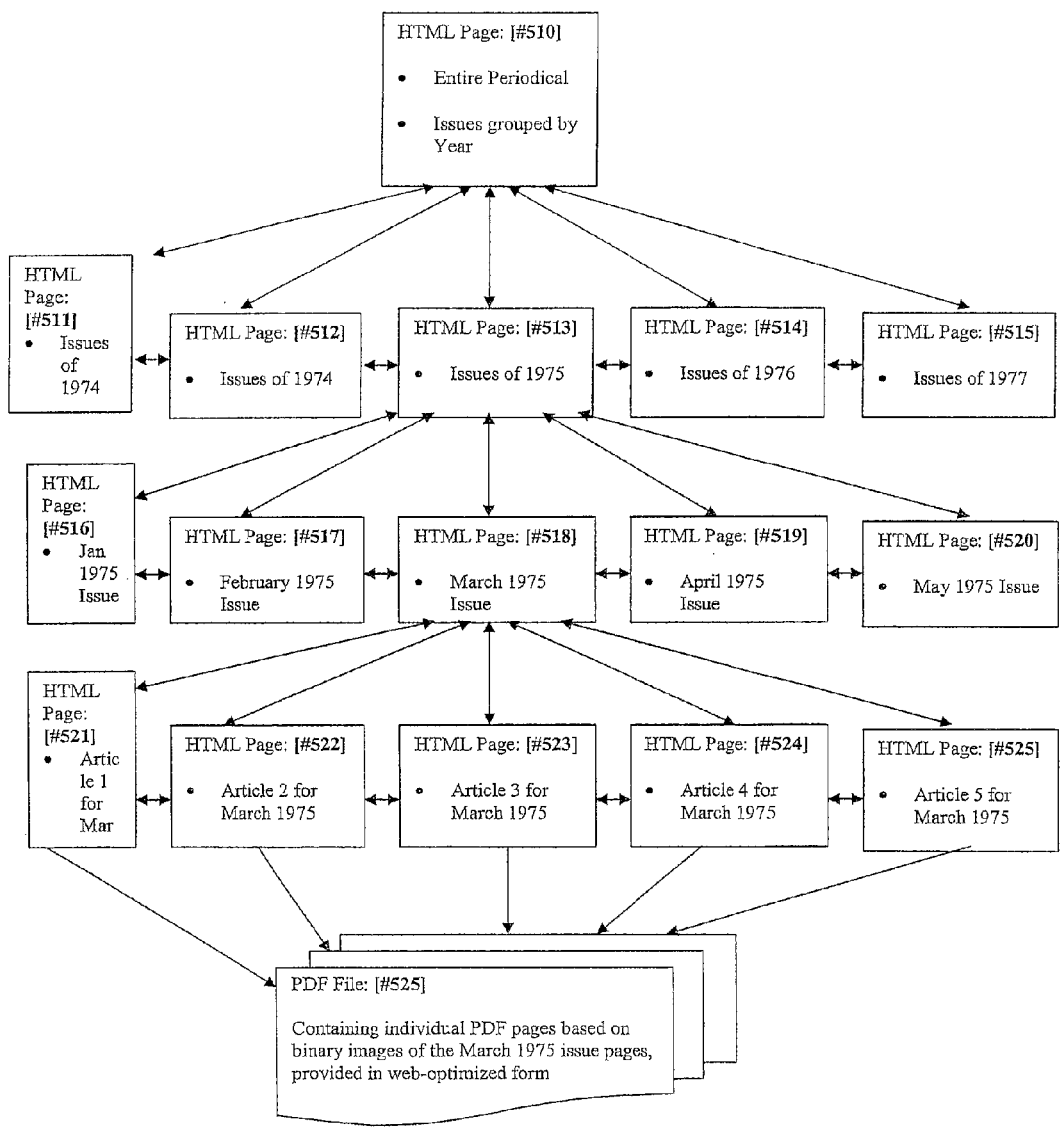
FIG. 5 shows a schematic diagram representing an overview portion of the interlinked structure for a digitized periodical under the example embodiment of this invention.

FIG. 5 shows a schematic diagram representing an overview portion of the interlinked structure for a digitized periodical under the example embodiment of this invention. A Navigation Page [#510] represents the entire periodical, displaying an overview of its issues grouped by year. This Navigation Page is then cross-linked with the Navigation Pages [#511-515] representing the grouped issues of the individual years of the periodical. One of these, the year 1975 Navigation Page [#513], is shown cross-linked with the Navigation Pages [#516-520] representing the individual issues of that year. Similarly, the March 1975 issue Navigation Page [#518] is shown cross-linked with the Navigation Pages [#521-525] representing the individual articles of that issue. Finally, each of these article Navigation Pages [#521-525] provides a link to the appropriate point in the Content File for that issue. For this embodiment, the Navigation Pages are provided as HTML Web Pages and the Content File is a PDF file.

Figure 6:
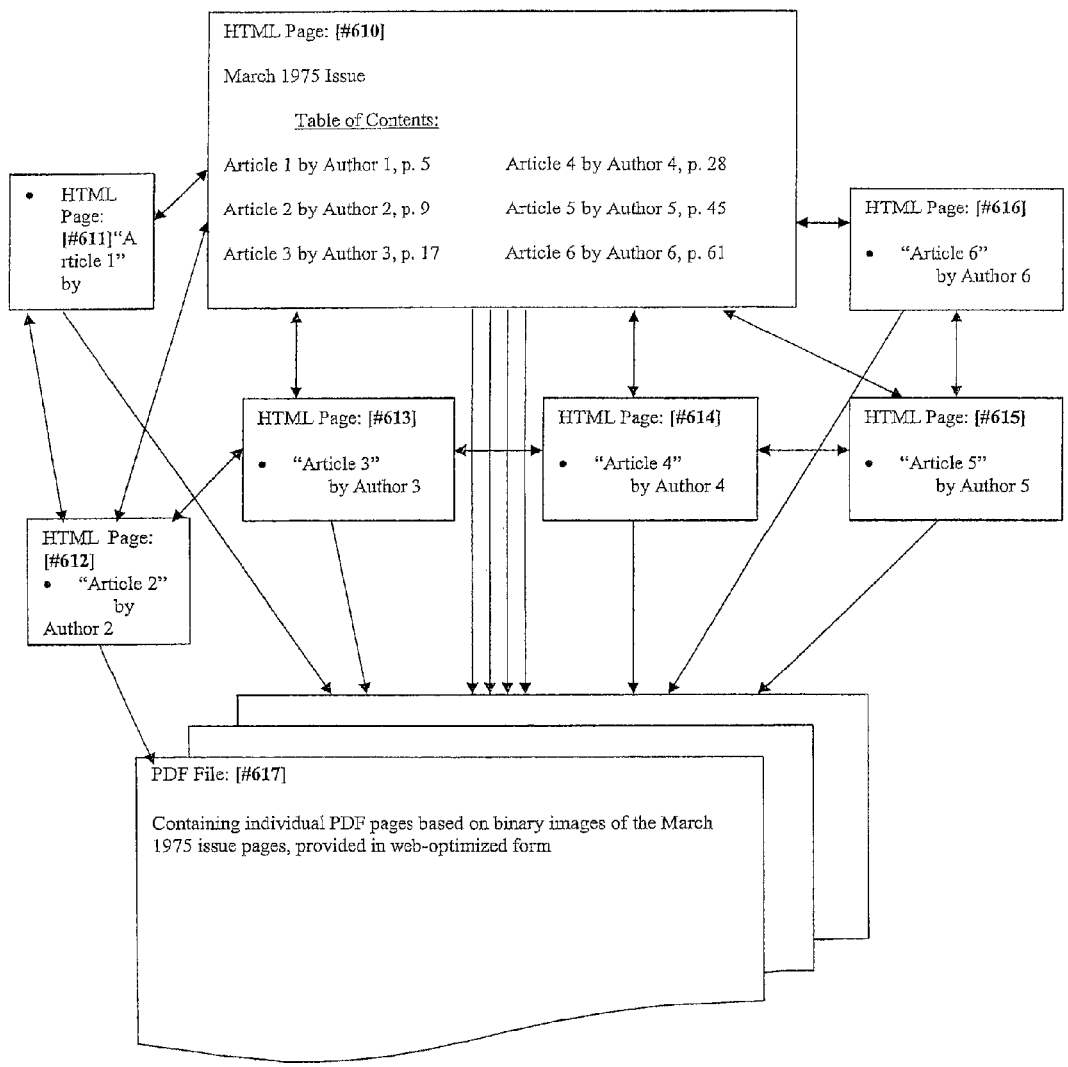
FIG. 6 shows a schematic diagram representing a more detailed view of the interlinked structure for a digitized periodical issue under the example embodiment of this invention.

FIG. 6 shows a schematic diagram representing a more detailed view of the interlinked structure for a digitized periodical issue under the example embodiment of this invention. A Navigation Page [#610] displays the issue's table of contents and is cross-linked with Navigation Pages [#611-616] representing the different articles in the issue; each article Navigation Page is also cross-linked to those for its neighboring articles. In addition, these article Navigation Pages provide links to the appropriate points in the Content File [#617]

for the entire issue. For this embodiment, the Navigation Pages are provided as HTML Web Pages and the Content File is a PDF file.

Figure 7:
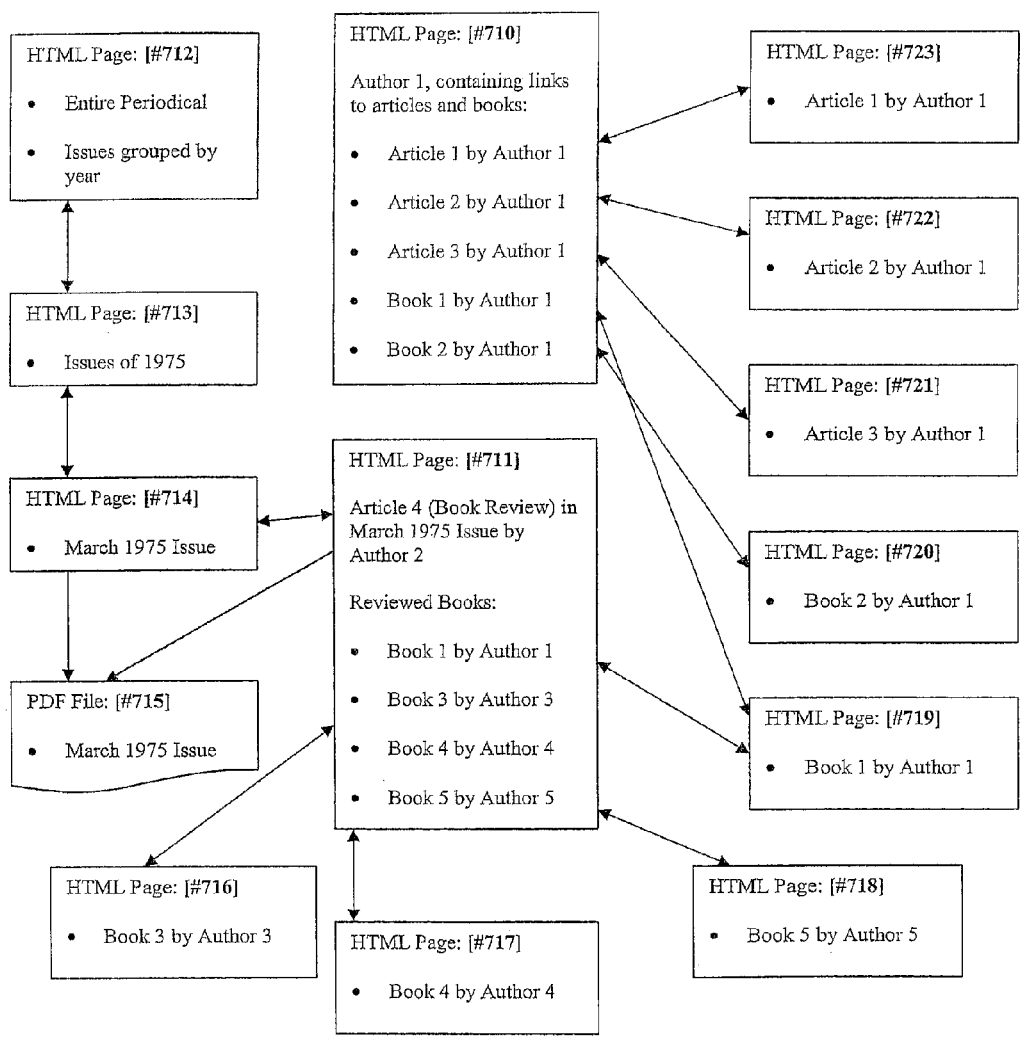
FIG. 7 shows a schematic diagram representing a portion of the interlinked structure of digitized books, periodical issues, and authors under the example embodiment of this invention.

FIG. 7 shows a schematic diagram representing a portion of the interlinked structure of digitized books, periodical issues, and authors under the example embodiment of this invention. A Navigation Page [#710] represents the grouped works of a given author and is cross-linked with the Navigation Pages for three of his articles [#721-723] and two of his books [#719,720]. In addition, the Navigation Page [#719] for one of those books is shown cross-linked with the Navigation Page [#711] of a book review article reviewing that book; that review Navigation Page [#711] is also cross-linked with the Navigation Pages for the other books it discusses [#716-718] as well as the Navigation Page for its entire periodical issue [#714] and it also provides a link to the appropriate point in the issue Content File [#715]. Finally, the issue Navigation Page [#714] similarly provides links to points in its issue Content File [#715] and is shown cross-linked with the Navigation Page for the grouped issues of that year [#713], which in turn is cross-linked to the Navigation Page for the overall periodical. For this embodiment, the Navigation Pages are provided as HTML Web Pages and the Content File is a PDF file.

Figure 9:
FIG. 9 illustrates an example navigation page as generated in an embodiment for use in navigating the content of a single book.

FIG. 9 illustrates an example navigation page as generated in an embodiment for use in navigating the content of a single book. In FIG. 9, a navigation page 900 comprises a link 902 to an electronic digital representation of the book, such as a PDF file. Author link 904, when selected, causes generating another navigation page showing all content material items associated with the author named in the link.

Navigation page 900 further comprises a content link section 910 that comprises one or more links 914 to particular articles, chapters, or other sections of the book. For example, a first link 914 identifies a first article in the book and, when selected, causes the system to display that article. Alternatively, if the first article has one or more sub-sections or hierarchically lower levels of content, then selecting first link 914 causes generating another navigation page that identifies the sub-sections or levels. For each link 914, a document link 916 identifies an electronic digital representation of the article, such as a PDF file. Navigation page 900 also may comprise a digital image 908 of a portion of the book associated with the content link section 910 to enable a user to visually correlate the content link section and the actual content material item.

FIG. 10 illustrates an example navigation page as generated in an embodiment and comprising a periodical decade page. In FIG. 10, a navigation page 1000 comprises navigation links 1002 associated with various levels of display and which, when selected, cause generating additional navigation pages that provide information about all decades of publications of the associated periodical, all issues of the periodical, all periodicals in the database, and all publications in the database.

For the periodical identified in navigation page 1000—in this example, the journal "Dissent"—one or more period links 1004 are provided and, when selected, cause generating additional navigation pages associated with time periods within the decade represented by the periodical navigation page. Previous-Next links 1006 enable generating additional navigation pages that are similar in form to navigation page 1000 but are associated with a different decade of publication.

Navigation page 1000 further comprises display control links 1008 which, when selected, change the format and content of a content section 1010 of the navigation page. For example, different display control links 1008 can cause generating a new navigation page that shows a list of all issues of the publication for the associated decade, all covers, all columns, etc.

Within the content section 1010, a graphical image 1018 indicates the cover of the first issue of the associated decade. Each issue within that decade is represented by issue information 1012, which may comprise an issue link 1014 and a document link 1016. Selecting the issue link 1014 causes generating a new navigation page that shows all content within the selected issue, similar in form to FIG. 11. Selecting the document link 1016 causes displaying the electronic digital representation of the selected issue, such as a PDF file.

Figure 11:
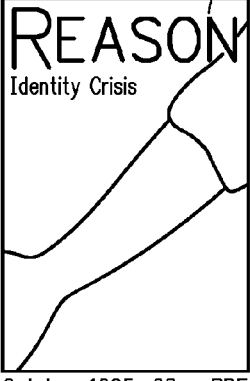
FIG. 11 illustrates an example navigation page as generated in an embodiment and comprising a periodical issue page.

FIG. 11 illustrates an example navigation page as generated in an embodiment and comprising a periodical issue page. In FIG. 11, a navigation page 1100 comprises navigation links 1102 associated with various levels of display and which, when selected, cause generating additional navigation pages that provide information about all issues of publication year of the periodical, all issues of the periodical, all periodicals in the database, and all publications in the database.

For the periodical identified in navigation page 1102—in this example, the journal "Reason"—a document link 1104 enables displaying the electronic digital representation of the periodical, such as a PDF file. Organization link 1106, when selected, causes generating another navigation page showing all content material items associated with the organization that is named in the link. FIG. 13 is an example organization page. Previous-Next links 1108 enable generating additional navigation pages that are similar in fowl to navigation page 1000 but are associated with a different issue of the publication.

Navigation page 1100 further comprises display control links 1110 which, when selected, change the format and content of a content section 1114 of the navigation page. For example, different display control links 1110 can cause generating a new navigation page that shows a condensed table of contents, the first text in the periodical, only articles in the periodical, only book reviews in the periodical, etc.

Within the content section 1114, a graphical image 1112 indicates the cover of the periodical. Each subordinate content item within the issue, such as articles or book reviews, is represented by article information 1115, which may comprise an article link 1116 and a document link 1118. Selecting the article link 1116 causes generating a new navigation page that shows all content within the selected article, such as a navigation page having links to subsections of the article, if any. Selecting the document link 1118 causes displaying the electronic digital representation of the selected article, such as a PDF file.

FIG. 12 illustrates an example navigation page as generated in an embodiment and comprising an author page. In FIG. 12, a navigation page 1200 comprises an author indicator 1202 that identifies the author associated with all content material items identified in a content section 1214 of the navigation page. Navigation page 1200 further comprises display control links 1204 which, when selected, change the format and content of a content section 1214 of the navigation page. For example, different display control links 1204 can cause generating a new navigation page that shows only books that the author has reviewed, only chapters of the author, articles of the author, book reviews written by the author, etc.

Navigation page 1200 may comprise one or more format links 1206 which, when selected, cause generating a new navigation page in a different format. For example, format links 1206 can cause generating a navigation page in a condensed format, a navigation page showing only covers of the author's books, covers in large image format, etc.

Navigation page 1200 may comprise one or more sort links 1208 which, when selected, cause generating a new navigation page in which the content section 1214 is sorted in different ways. For example, various sort links 1208 can cause the system to generate a new navigation page in which the content material items shown in content section 1214 are sorted by title, date, size, order, etc.

Navigation page 1200 also may comprise one or more decade links 1210 that cause generating a new navigation page that shows only content material items of the associated author that were published in the decade or other time period indicated in the link. Navigation page 1200 also may comprise one or more title links 1212 that cause generating a new navigation page that shows only content material items of the associated author that have titles that begin with the alphabetic letter indicated in the link.

In an embodiment, navigation page 1200 may comprise range links 1213 which, when selected, cause generating a new navigation page that includes only content material items of the associated author within a specified range of result items. For example, FIG. 12 indicates eight items numbered 1-8 within the first 1-25 result items. Other links can display content material items within other ranges of results associated with the author.

Content section 1214 comprises one or more content material item information sets 1215 that provide specific information about content material items of the author. For example, information set 1215 comprises a title item 1216 that indicates the name of a content material item authored by the associated author and may include a title link 1217 to the Navigation Page associated with that content material item and a periodical link 1220 to the periodical in which the item or title was published. Selecting a document link 1218 causes displaying the electronic digital representation of the selected content material item, such as a PDF file.

FIG. 13 illustrates an example navigation page as generated in an embodiment and comprising an organization page. In FIG. 13, a navigation page 1300 comprises an organization link 1302 that identifies the organization and which provides a link to the Home web page of that organization, if one exists.

Navigation page 1300 further comprises display control links 1304 which, when selected, change the format and content of a content section 1314 of the navigation page. For example, different display control links 1304 can cause generating a new navigation page that shows all content material items that the associated organization has distributed, periodicals of the organization only, sets of the organization only, books only, major references, etc.

Navigation page 1300 further comprises format control links 1306 which, when selected, change the format of content section 1314. For example, format control links 1306 can cause generating a new navigation page that shows a condensed list of content material items, only covers of the content material items of the organization, only large graphical images of covers of the content material items, etc.

Navigation page 1300 may comprise one or more sort links 1308 which, when selected, cause generating a new navigation page in which the content section 1314 is sorted in different ways. For example, various sort links 1308 can cause the system to generate a new navigation page in which the content material items shown in content section 1314 are sorted by title, date, size, order, etc. Navigation page 1300 also may comprise one or more decade links 1310 that cause generating a new navigation page that shows only content material items of the associated organization that were published in the decade or other time period indicated in the link. Navigation page 1300 also may comprise one or more title links 1312 that cause generating a new navigation page that shows only content material items of the associated organization that have titles that begin with the alphabetic letter indicated in the link.

Content section 1314 may comprise an enumerated list of content material items associated with an organization. Each content material item is identified by a graphical image 1320 of the content material item, a title link 1316, and a document link 1318. The title link 1316, when selected, causes displaying a new navigation page associated with the content material specified by the selected title. Selecting the document link 1318 causes displaying an electronic digital representation of the content material item, such as a PDF file.

FIG. 9-13 represent examples of navigation pages that an embodiment can generate. In other embodiments, other particular navigation pages may be generated.

5.0 Example Hardware Implementation

Figure 8:
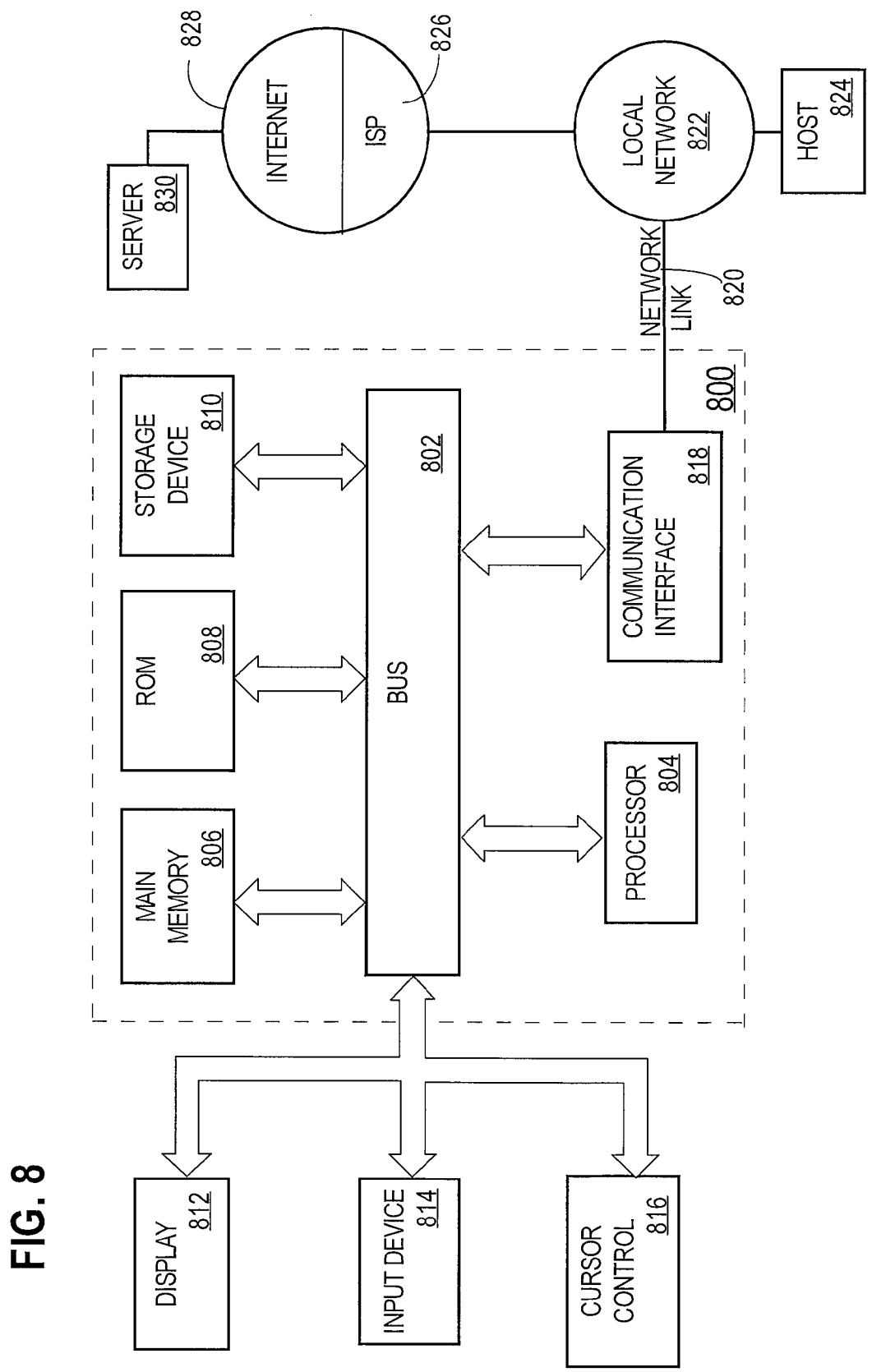
FIG. 8 illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, trackball, stylus, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for presenting and organizing digitized content material on a network. According to one embodiment of the invention, presenting and organizing digitized content material on a network is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for presenting and organizing digitized content material on a network as described herein.

The received code may be executed by processor 804 as it is received, and/or stored in storage device 810, or other non-volatile storage for later execution. In this manner, computer system 800 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, instead of being provided as a text-embedded single PDF file, the Content File representing the page-images of a digitized publication could also be provided in some other format, such as being TIFFs, JPEGs, or some other present or future binary image format. In various embodiments, the page-images are displayed as stand-alone binary images or displayed within a lightweight webpage framework, such as an inserted image within the inline frame of an HTML page. The page-images may be bound together into a single file, provided as separate files, or exist as "Binary Large Objects" (BLOBs) inside a database. Instead of being composed of simple HTML text, the Navigation Pages may be also rendered in XML or some other present or future lightweight, text-oriented format.

Instead of being based on ColdFusion, the templates used to produce the lightweight dynamic Navigation Pages might instead use PHP or some other present or future web application programming language. In addition, instead of MySQL, the database system could instead rely on Oracle SQL, Microsoft SQL-Server, or some other present or future SQL or other relational database. Instead of using Apache, the Internet requests could be managed by some other present or future web page server.

Instead of being restricted to printed material, the primary content Navigation Pages of the system could also extended to other forms of content, such as films and music albums, or other types of digitized audio or video content.

A wide variety of additional types of secondary abstract Navigation Pages could also be added to the system, besides those just for authors and organizations. These could be used to organize and group the content Navigation Pages in additional ways.

What is claimed is:
1. A computer system, comprising:
one or more content file servers of a computer and having recorded thereon a plurality of digital content material items, and a plurality of digital graphical image files comprising graphical images associated with the content material items; wherein each of content material items comprises one or more data files of digitized electronic printed, audio, or video content material;
one or more navigation page servers of the same computer or a different computer and each comprising:
one or more storage devices having recorded thereon a plurality of navigation page templates;
a database comprising stored descriptive information about the content material items, including hierarchical and other relationships both between different content material items and between different subcomponents of content material items;
logic encoded on the one or more storage devices and when executed operable to perform:
receiving a request to view a particular navigation page, comprising a dynamically-generated electronic document;
selecting one of the navigation page templates based on the request;
creating and sending to the database, one or more queries for the descriptive information relating to the particular navigation page;
receiving one or more results to the queries;
generating, based on the one or more results, a particular navigation page comprising descriptive information about one or more of the content material items, portions thereof, or abstract collections thereof; a plurality of links to other such navigation pages; and
zero or more links to particular content material items or portions thereof;
sending only the particular navigation page to a client computer.

2. The system of claim 1, wherein the particular navigation page further comprises one or more embedded graphic images associated with the particular content material items.

3. The system of claim 1, wherein the content material items comprise digitized books or periodical issues including chapters and articles.

4. The system of claim 1, wherein each of the navigation page templates specifies a design and a layout of a display of a particular abstract view of one or more of the content material items.

5. The system of claim 1, wherein the particular navigation page represents an abstract view of at least a portion of a table of contents of a particular content material item comprising a digitized book or periodical issue, and wherein the particular navigation page comprises one or more direct links to portions of the content material item corresponding to initial pages of particular chapters or articles identified in the table of contents.

6. The system of claim 1, wherein the number of the content file servers is less than the number of the navigation page servers.

7. The system of claim 1, wherein the particular navigation page comprises a plurality of links to top-level navigation pages, wherein each of the top-level navigation pages represents a discrete time period among a plurality of time periods of a serial periodical, wherein each of the top-level navigation pages comprises a plurality of links to issues of the serial periodical published within the discrete time period.

8. The system of claim 1, wherein the particular navigation page comprises an abstract navigation page comprising a series of one or more descriptions and links to other navigation pages each associated with publications possessing a particular value of a specified metadata feature.

9. The system of claim 8, wherein the metadata feature comprises any one of publication author, publication organization, publication publisher, and book reviewed in a particular review article, and review article reviewing a particular book.

10. The system of claim 1, further comprising logic which when executed is operable to perform receiving a selection of any of the links in the particular navigation page; and providing to the client computer the content material items that are referenced in the selected link.

11. The system of claim 1, wherein the particular navigation page comprises an HTML document and wherein one or more of the data files comprises PDF documents.

12. An apparatus, comprising:
one or more content file servers of a computer and having recorded thereon a plurality of digital content material items, and a plurality of digital graphical image files comprising graphical images associated with the content material items; wherein each of content material items comprises one or more data files of digitized electronic printed, audio, or video content material;
one or more navigation page servers of the same computer or a different computer and each comprising:
one or more storage devices having recorded thereon a plurality of navigation page templates;
a database comprising stored descriptive information about the content material items, including hierarchical and other relationships both between different content material items and between different subcomponents of content material items;
means for receiving a request to view a particular navigation page, comprising a dynamically-generated electronic document;
means for selecting one of the navigation page templates based on the request;
means for creating and sending to the database, one or more queries for the descriptive information relating to the particular navigation page;
means for receiving one or more results to the queries;
means for generating, based on the one or more results, a particular navigation page comprising descriptive information about one or more of the content material items, portions thereof, or abstract collections thereof; a plurality of links to other such navigation pages; and zero or more links to particular content material items or portions thereof;
means for sending only the particular navigation page to a client computer.

13. The apparatus of claim 12, wherein the particular navigation page further comprises one or more embedded graphic images associated with the particular content material items.

14. The apparatus of claim 12, wherein the content material items comprise digitized books or periodical issues including chapters and articles.

15. The apparatus of claim 12, wherein each of the navigation page templates specifies a design and a layout of a display of a particular abstract view of one or more of the content material items.

16. The apparatus of claim 12, wherein the particular navigation page represents an abstract view of at least a portion of a table of contents of a particular content material item comprising a digitized book or periodical issue, and wherein the particular navigation page comprises one or more direct links to portions of the content material item corresponding to initial pages of particular chapters or articles identified in the table of contents.

17. The apparatus of claim 12, wherein the number of the content file servers is less than the number of the navigation page servers.

18. The apparatus of claim 12, wherein the particular navigation page comprises a plurality of links to top-level navigation pages, wherein each of the top-level navigation pages represents a discrete time period among a plurality of time periods of a serial periodical, wherein each of the top-level navigation pages comprises a plurality of links to issues of the serial periodical published within the discrete time period.

19. The apparatus of claim 12, wherein the particular navigation page comprises an abstract navigation page comprising a series of one or more descriptions and links to other navigation pages each associated with publications possessing a particular value of a specified metadata feature.

20. The apparatus of claim 19, wherein the metadata feature comprises any one of publication author, publication organization, publication publisher, and book reviewed in a particular review article, and review article reviewing a particular book.

21. The apparatus of claim 12, further comprising means for receiving a selection of any of the links in the particular navigation page; and means for providing to the client computer the content material items that are referenced in the selected link.

22. The apparatus of claim 12, wherein the particular navigation page comprises an HTML document and wherein one or more of the data files comprise PDF documents.

23. A non-transitory computer-readable medium storing one or more sequences of instructions, which instructions, when executed by one or more processors, cause the one or more processors to perform:
   establishing communications with one or more content file servers having recorded thereon a plurality of digital content material items, and a plurality of digital graphical image files comprising graphical images associated with the content material items; wherein each of content material items comprises one or more data files of digitized electronic printed, audio, or video content material;
   receiving a request to view a particular navigation page, comprising a dynamically-generated electronic document;
   selecting one of a plurality of stored navigation page templates based on the request; creating and sending to a database, one or more queries for descriptive information relating to the particular navigation page, wherein the database comprises the descriptive information about the content material items, including hierarchical and other relationships both between different content material items and between different subcomponents of content material items;
   receiving one or more results to the queries;
   generating, based on the one or more results, the particular navigation page comprising descriptive information about one or more of the content material items, portions thereof, or abstract collections thereof; a plurality of links to other such navigation pages; and zero or more links to particular content material items or portions thereof;
   sending only the particular navigation page to a client computer.

24. The computer-readable medium of claim 23, wherein the particular navigation page further comprises one or more embedded graphic images associated with the particular content material items.

25. The computer-readable medium of claim 23, wherein the content material items comprise digitized books or periodical issues including chapters and articles.

26. The computer-readable medium of claim 23, wherein each of the navigation page templates specifies a design and a layout of a display of a particular abstract view of one or more of the content material items.

27. The computer-readable medium of claim 23, wherein the particular navigation page represents an abstract view of at least a portion of a table of contents of a particular content material item comprising a digitized book or periodical issue, and wherein the particular navigation page comprises one or more direct links to portions of the content material item corresponding to initial pages of particular chapters or articles identified in the table of contents.

28. The computer-readable medium of claim 23, wherein the number of the content file servers is less than the number of the navigation page servers.

29. The computer-readable medium of claim 23, wherein the particular navigation page comprises a plurality of links to top-level navigation pages, wherein each of the top-level navigation pages represents a discrete time period among a plurality of time periods of a serial periodical, wherein each of the top-level navigation pages comprises a plurality of links to issues of the serial periodical published within the discrete time period.

30. The computer-readable medium of claim 23, wherein the particular navigation page comprises an abstract navigation page comprising a series of one or more descriptions and links to other navigation pages each associated with publications possessing a particular value of a specified metadata feature.

31. The computer-readable medium of claim 30, wherein the metadata feature comprises any one of publication author, publication organization, publication publisher, and book reviewed in a particular review article, and review article reviewing a particular book.

32. The computer-readable medium of claim 23, further comprising instructions which when executed cause receiving a selection of any of the links in the particular navigation page; and means for providing to the client computer the particular content material items that are referenced in the selected link.

33. The computer-readable medium of claim 23, wherein the particular navigation page comprises an HTML document and wherein one or more of the data files comprise PDF documents.

34. A method performed by one or more processors, the method comprising:
   establishing communications with one or more content file servers having recorded thereon a plurality of digital content material items, and a plurality of digital graphical image files comprising graphical images associated with the content material items; wherein each of content material items comprises one or more data files of digitized electronic printed, audio, or video content material;
   receiving a request to view a particular navigation page, comprising a dynamically-generated electronic document;
   selecting one of a plurality of stored navigation page templates based on the request;
   creating and sending to a database, one or more queries for descriptive information relating to the particular navigation page, wherein the database comprises the descriptive information about the content material items, including hierarchical and other relationships both between different content material items and between different subcomponents of content material items;
   receiving one or more results to the queries;

generating, based on the one or more results, the particular navigation page comprising descriptive information about one or more of the content material items, portions thereof, or abstract collections thereof; a plurality of links to other such navigation pages; and zero or more links to particular content material items or portions thereof;

sending only the particular navigation page to a client computer.

35. The method of claim 34, wherein the particular navigation page further comprises one or more embedded graphic images associated with the particular content material items.

36. The method of claim 34, wherein the content material items comprise digitized books or periodical issues including chapters and articles.

37. The method of claim 34, wherein each of the navigation page templates specifies a design and a layout of a display of a particular abstract view of one or more of the content material items.

38. The method of claim 34, wherein the particular navigation page represents an abstract view of at least a portion of a table of contents of a particular content material item comprising a digitized book or periodical issue, and wherein the particular navigation page comprises one or more direct links to portions of the content material item corresponding to initial pages of particular chapters or articles identified in the table of contents.

39. The method of claim 34, wherein the number of the content file servers is less than the number of the navigation page servers.

40. The method of claim 34, wherein the particular navigation page comprises a plurality of links to top-level navigation pages, wherein each of the top-level navigation pages represents a discrete time period among a plurality of time periods of a serial periodical, wherein each of the top-level navigation pages comprises a plurality of links to issues of the serial periodical published within the discrete time period.

41. The method of claim 34, wherein the particular navigation page comprises an abstract navigation page comprising a series of one or more descriptions and links to other navigation pages each associated with publications possessing a particular value of a specified metadata feature.

42. The method of claim 41, wherein the metadata feature comprises any one of publication author, publication organization, publication publisher, and book reviewed in a particular review article, and review article reviewing a particular book.

43. The method of claim 34, further comprising receiving a selection of any of the links in the particular navigation page; and providing to the client computer the particular content material items that are referenced in the selected link.

44. The method of claim 34, wherein the particular navigation page comprises an HTML document and wherein one or more of the data files comprise PDF documents.

* * * * *